(12) United States Patent
Taylor et al.

(10) Patent No.: US 11,264,706 B2
(45) Date of Patent: Mar. 1, 2022

(54) OBJECT SENSOR INCLUDING PITCH COMPENSATION

(71) Applicant: Aptiv Technologies Limited, St. Michael (BB)

(72) Inventors: Ronald M. Taylor, Greentown, IN (US); Dennis C. Nohns, Kokomo, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 598 days.

(21) Appl. No.: 16/151,859

(22) Filed: Oct. 4, 2018

(65) Prior Publication Data
US 2020/0112085 A1    Apr. 9, 2020

(51) Int. Cl.
*H01Q 1/32* (2006.01)
*G01S 7/03* (2006.01)
*H01Q 1/12* (2006.01)
*H01Q 1/36* (2006.01)
*H01Q 3/08* (2006.01)
*H01Q 19/18* (2006.01)

(52) U.S. Cl.
CPC ........... *H01Q 1/3233* (2013.01); *G01S 7/032* (2013.01); *H01Q 1/1264* (2013.01); *H01Q 1/364* (2013.01); *H01Q 3/08* (2013.01); *H01Q 19/18* (2013.01)

(58) Field of Classification Search
CPC .... H01Q 1/3233; H01Q 1/1264; H01Q 1/364; H01Q 3/08; H01Q 19/18; G01S 7/032; G01S 2007/4034; G01S 7/497; G01S 7/03; G01S 7/4817; G01S 7/4815; G01S 7/4026; G01S 13/931; G01S 7/02
See application file for complete search history.

(56) References Cited

U.S. PATENT DOCUMENTS

| 2012/0019432 A1* | 1/2012 | Bowers | G02B 1/005 343/909 |
| 2017/0184705 A1* | 6/2017 | Fujii | G01S 7/4814 |
| 2018/0081038 A1 | 3/2018 | Medina et al. | |

FOREIGN PATENT DOCUMENTS

WO   2018/055513 A2   3/2018

OTHER PUBLICATIONS

European Search Report for Application No. 19198839, European Patent Office, dated Feb. 6, 2020.

* cited by examiner

*Primary Examiner* — Daryl C Pope
(74) *Attorney, Agent, or Firm* — Carlson, Gaskey & Olds, P.C.

(57) ABSTRACT

An illustrative example detector for use on a vehicle includes a radiation emitter having a near field region that is defined at least in part by a wavelength of radiation emitted by the radiation emitter. A radiation steering device includes a plurality of reflectors, an actuator, and a controller. The reflectors are situated to reflect the radiation emitted by the radiation emitter. The reflectors are in the near field region and have at least one characteristic that limits any phase shift of the reflected radiation. The actuator is configured to adjust an orientation of the reflectors. The controller is configured to determine an orientation of the plurality of reflectors relative to the radiation emitter to steer the emitted radiation reflected from the reflectors in a determined direction. The controller is configured to control the actuator to achieve the determined orientation.

19 Claims, 2 Drawing Sheets

OBJECT SENSOR INCLUDING PITCH COMPENSATION

BACKGROUND

Advances in electronics and technology have made it possible to incorporate a variety of advanced features on automotive vehicles. Various sensing technologies have been developed for detecting objects in a vicinity or pathway of a vehicle. Such systems are useful for detecting objects in the pathway or vicinity of a vehicle for parking assist and cruise control adjustment features, for example.

More recently, automated vehicle features have become possible to allow for autonomous or semi-autonomous vehicle control. For example, cruise control systems may incorporate RADAR or light detection and ranging (LIDAR) for detecting an object or another vehicle in the pathway of a vehicle. Depending on the approach speed, the cruise control setting may be automatically adjusted to reduce the speed of the vehicle based on detecting another vehicle in the pathway of the vehicle.

While RADAR and LIDAR systems have proven useful, including them on vehicles is not without challenges. For example, there are design tradeoffs associated with providing better performance on the one hand and meeting cost constraints on the other hand. For example, there is a desire to increase performance features such as angular field, angular resolution, and long-range detection. Providing those, however, involves additional power and sensitivity requirements that increase the expense associated with the detector. Additionally, increasing capability in some regards tends to decrease it in others. For example, achieving a larger effective vertical field may result in a smaller useful field, which is inefficient in terms of utilizing available radar design resources. There is an ongoing desire to optimize radar design to maximize value and minimize unused capability. Further, in some contexts, there are stringent size and packaging limitations that further complicate the design tradeoff considerations.

SUMMARY

An illustrative example detector for use on a vehicle includes a radiation emitter having a near field region that is defined at least in part by a wavelength of radiation emitted by the radiation emitter. A radiation steering device includes a plurality of reflectors, an actuator, and a controller. The plurality of reflectors are situated to reflect the radiation emitted by the radiation emitter. The reflectors are in the near field region and have at least one characteristic that limits any phase shift of the emitted radiation reflected from the reflectors. The actuator is configured to adjust an orientation of the plurality of reflectors. The controller is configured to determine an orientation of the plurality of reflectors relative to the radiation emitter to steer the emitted radiation reflected from the reflectors in a determined direction. The controller is configured to control the actuator to achieve the determined orientation.

In an embodiment having one or more features of the detector of the previous paragraph, the at least one characteristic of the plurality of reflectors comprises an index of refraction of a reflecting material of the reflectors and the index of refraction is less than 1.

In an embodiment having one or more features of the detector of any of the previous paragraphs, the at least one characteristic of the plurality of reflectors comprises a thickness of the reflecting material and the thickness is greater than a skin depth corresponding to a distance that the emitted radiation penetrates the reflecting material.

In an embodiment having one or more features of the detector of any of the previous paragraphs, the thickness is at least 5 times greater than the skin depth.

In an embodiment having one or more features of the detector of any of the previous paragraphs, the distance that the emitted radiation penetrates the reflecting material is based on the wavelength of the emitted radiation, a resistivity of the reflecting material and a relative permeability of the reflecting material.

In an embodiment having one or more features of the detector of any of the previous paragraphs, the reflecting material has a critical angle based on the index of refraction and the controller is configured to determine the orientation of the plurality of reflectors relative to the radiation emitter such than an angle of incidence of the emitted radiation approaching the reflectors is larger than the critical angle.

In an embodiment having one or more features of the detector of any of the previous paragraphs, the plurality of reflectors comprise a reflecting material and the reflecting material comprises at least one of gold, copper or silver.

In an embodiment having one or more features of the detector of any of the previous paragraphs, the plurality of reflectors comprise a reflecting material and the reflecting material comprises a mesh.

In an embodiment having one or more features of the detector of any of the previous paragraphs, the detector is supported on a vehicle, the controller is configured to receive an indication of a pitch angle of the vehicle, and the controller determines the orientation of the plurality of reflectors based on the pitch angle of the vehicle.

In an embodiment having one or more features of the detector of any of the previous paragraphs, the controller is configured to control the actuator to dynamically adjust the orientation of the plurality of reflectors based on changes in the pitch angle of the vehicle.

In an embodiment having one or more features of the detector of any of the previous paragraphs, the orientation is the same for all of the reflectors.

In an embodiment having one or more features of the detector of any of the previous paragraphs, the plurality of reflectors comprises a plurality of moveable louvers and the actuator adjusts the orientation the plurality of moveable louvers simultaneously.

An illustrative example method of directing radiation emitted by a detector having a near field region that is defined at least in part by a wavelength of radiation emitted by the detector includes determining a direction for the radiation and adjusting an orientation of a plurality of reflectors to steer the radiation emitted by the detector and reflected from the reflectors in the determined direction. The plurality of reflectors are in the near field region and have at least one characteristic that limits any phase shift of the emitted radiation reflected from the reflectors.

In an embodiment having one or more features of the method of the previous paragraph, the detector is supported on a vehicle and the method comprises determining a pitch angle of the vehicle and determining the orientation of the plurality of reflectors based on the pitch angle of the vehicle.

An embodiment having one or more features of the method of any of the previous paragraphs includes dynamically adjusting the orientation of the plurality of reflectors based on changes in the pitch angle of the vehicle.

An embodiment having one or more features of the method of any of the previous paragraphs includes adjusting the orientation of all of the reflectors simultaneously and wherein the orientation of all of the reflectors is the same relative to the detector.

In an embodiment having one or more features of the method of any of the previous paragraphs, the at least one characteristic of the plurality of reflectors comprises an index of refraction of a reflecting material of the reflectors and the index of refraction is less than 1.

In an embodiment having one or more features of the method of any of the previous paragraphs, the at least one characteristic of the plurality of reflectors comprises a thickness of the reflecting material, the thickness is greater than a skin depth corresponding to a distance that the emitted radiation penetrates the reflecting material, and the distance that the emitted radiation penetrates the reflecting material is based on the wavelength of the emitted radiation, a resistivity of the reflecting material and a relative permeability of the reflecting material.

In an embodiment having one or more features of the method of any of the previous paragraphs, the reflecting material has a critical angle based on the index of refraction and the controller is configured to determine the orientation of the plurality of reflectors relative to the radiation emitter such than an angle of incidence of the emitted radiation approaching the reflectors is larger than the critical angle.

In an embodiment having one or more features of the method of any of the previous paragraphs, the plurality of reflectors comprise a reflecting material and the reflecting material comprises a mesh.

The various features and advantages of at least one disclosed example embodiment will become apparent to those skilled in the art from the following detailed description. The drawings that accompany the detailed description can be briefly described as follows.

DETAILED DESCRIPTION

Figure 1:
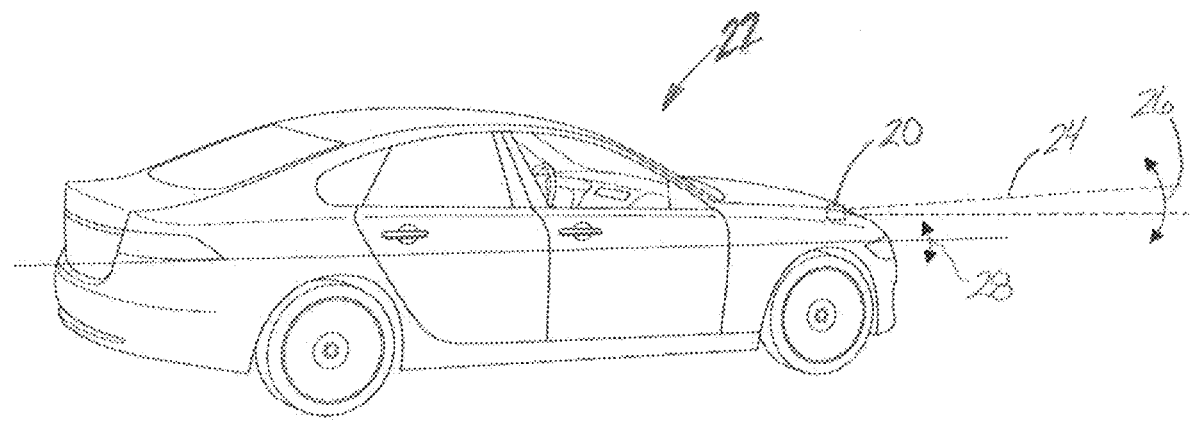
FIG. 1 schematically illustrates a vehicle including a sensor device designed according to an embodiment of this invention.

FIG. 1 schematically illustrates a detector 20 on a vehicle 22. The detector 20 is useful for detecting objects in a vicinity of the vehicle 22. While the detector 20 may take various forms, for discussion purposes, the detector 20 is considered a radar detector that utilizes known radar techniques.

The detector 20 has a field of view schematically shown at 24. One characteristic of the detector 20 is that the field of view 24 is adjustable in a vertical direction as shown by the arrows 26. In the illustrated example embodiment, the field of view 24 is dynamically adjustable to compensate for changes in the pitch angle of the vehicle 22, which is represented at 28 in FIG. 1. Adjusting the field of view 24 provides angular compensation to offset vehicle pitch motion so that the field of view 24 is directed along a desired trajectory from the detector 22 without requiring an expanded vertical field.

Figure 2:
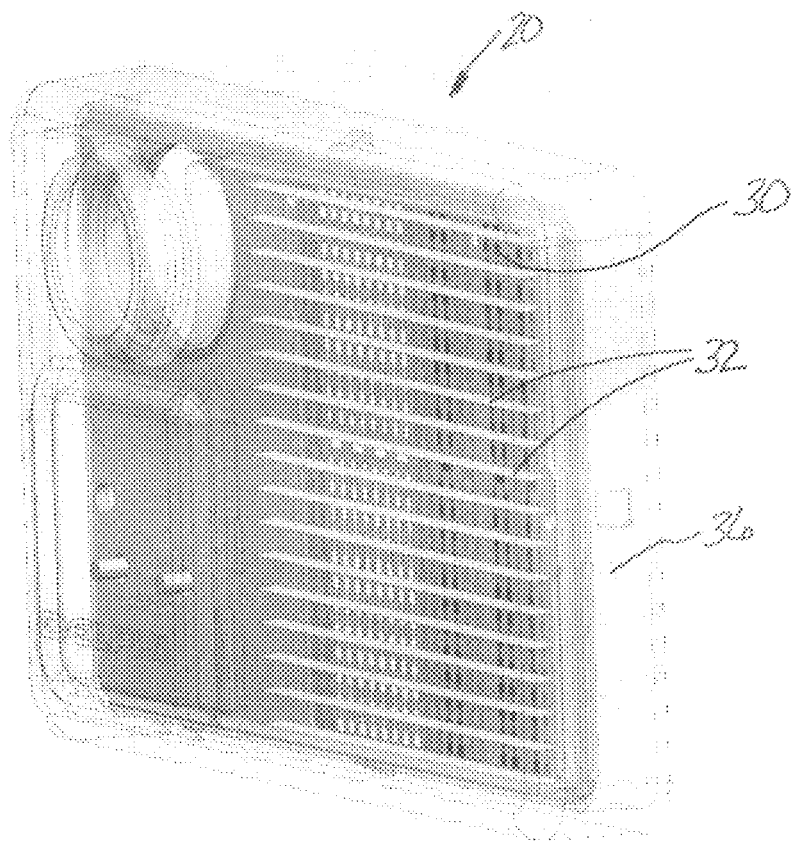
FIG. 2 is a diagrammatic illustration showing selected features of a sensor device designed according to an embodiment of this invention.
Figure 3:
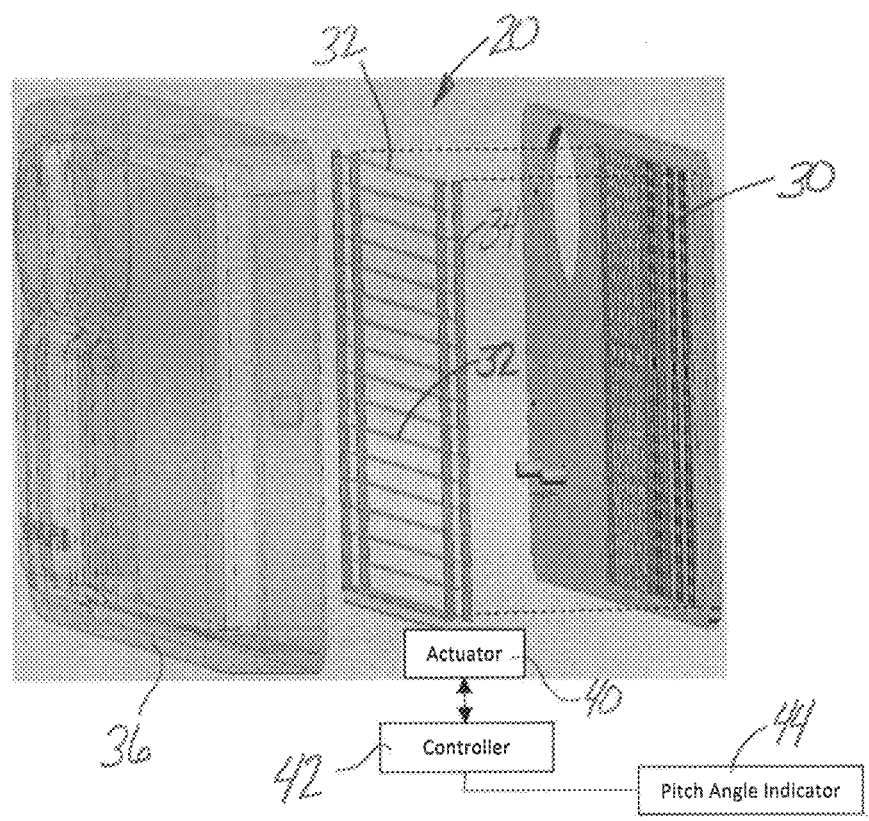
FIG. 3 diagrammatically illustrates features of the sensor shown in FIG. 2 in a partially exploded view.

FIGS. 2 and 3 illustrate selected features of an example embodiment of the detector 20. A radiation emitter 30 comprises a plurality of radar antenna elements in this example. A plurality of reflectors 32 are situated in a near field region of the radiation emitter 30. The near field region is based, at least in part, on the wavelength of the radiation emitted by the radiation emitter 30. For example, the near field boundary is defined by $2*D/\lambda$, where D is the aperture diameter of the antenna and $\lambda$ is the wavelength of the emitted radiation. The area between the near field boundary and the emitter 30 is the near field region and fits within a distance of approximately twice the wavelength from the emitter 30. For example, a long-range radar wavelength useful on the vehicle 22 of 76 GHz has an associated near field region of approximately 8 millimeters. The reflectors 32 are situated within that 8 millimeter space.

The reflectors 32 have at least one characteristic that limits any phase shift of the emitted radiation reflected from the reflectors 32. In the illustrated example embodiment, there is no phase shift of the emitted radiation reflected from the reflectors 32. Avoiding or minimizing any phase shift avoids any requirement for further adaptations to compensate for such phase shift and maintains radar performance as expected from the design of the emitter 30.

In the illustrated example embodiment, the reflectors 32 include a reflecting material on at least one surface. The reflecting material has an index of refraction that is less than 1. The reflecting material in some embodiments comprises a metal, such as gold, copper, or silver. Gold has a refractive index of about 0.3, copper has a refractive index of about 0.5, and silver has a refractive index of about 0.2. Utilizing a reflecting material with a refractive index less than 1 over the emitter wavelength bandpass avoids any phase change of the electrical field of the emitted radiation that is reflected from the reflectors 32.

The reflectors 32 are also designed and situated relative to the radiation emitter 30 so that the angle of incidence of the emitted radiation approaching the reflectors 32 is larger than the critical angle of the reflecting material. As known, a critical angle of a reflecting material is determined by the arcsine of the refractive index of that material. Controlling the angle of incidence in this manner allows the electrical field and magnetic field of the emitted radiation to reflect from the reflectors 32 at an angle equal to the incidence angle with no phase change after penetrating the surface of the reflecting material for a small distance. The amount of penetration, as known, is based on the wavelength of the radiation, the resistivity of the reflecting material, and the relative permeability of the reflecting material. The penetration distance may be referred to as the skin depth of the reflecting material.

The skin depth of such reflecting materials may be determined in a known manner. The reflectors 32 have a thickness that is at least five times the skin depth of the reflecting material such that when the angle of incidence is greater than the critical angle of the reflecting material the emitted radiation reflected from the reflectors 32 will effectively have no phase change relative to the electromagnetic field in the near field region of the radiation emitter 30.

For example, reflectors 32 having gold reflecting material have an associated critical angle of 15.7 degrees. With a skin depth of about 1.7 microns and a minimum thickness of the reflecting material of 8.6 microns, the reflectors 32 do not introduce any undesired phase shift. Another example embodiment includes a copper reflecting material with a critical angle of 27.4 degrees, a skin depth of 1.5 microns and a thickness of 7.5 microns. Another example embodiment includes silver as the reflecting material having a critical angle of 8.6 degrees, a skin depth of 1.5 microns, and a thickness of 7.3 microns. With such reflectors 32, the electromagnetic field of the radiation emitted by the radiation emitter 30, whose oscillations contain electric and magnetic fields that are perpendicular to each other, will not be phase shifted when reflected from the reflectors 32.

A supporting structure 34 supports the reflectors 32 so that each of them has the same orientation relative to the radiation emitter 30. In the illustrated example, the reflectors 32 are situated as a plurality of louvers whose angular position relative to the radiation emitter 30 may be adjusted simultaneously to direct the radiation emitted from the radiation emitters 30 in a desired direction.

As schematically shown in FIG. 3, an actuator 40 causes movement of at least one portion of the support structure 34 to change an orientation of the reflectors 32. A controller 42 is configured to control the actuator 40 to cause the reflectors 32 to be in a desired orientation relative to the radiation emitter 30 to direct radiation from the detector 20 along a desired trajectory or in a desired direction. The controller 42 is configured or suitably programmed to determine the orientation based upon, for example, a pitch angle of the vehicle 22. FIG. 3 includes a pitch angle indicator 44, which may be an accelerometer as an example, that provides an indication of the pitch angle of the vehicle 22. As the vehicle 22 travels over different terrain and the pitch angle of the vehicle 22 changes, the controller 42 dynamically causes the orientation of the reflectors 32 to change by controlling the actuator 40 to direct the field of view 24 of the detector 20 along a desired direction. In an example embodiment, the controller 42 is programmed or configured to determine the pitch angle from the pitch angle indicator 44, determine an amount of movement of the reflectors 32 needed to achieve a desired angle of reflection, and control the actuator 40 to cause such movement. Feedback circuitry in the actuator circuit provides closed loop control over the orientation of the reflectors 32. Depending on the configuration of the actuator 40, a capacitance of the actuator may provide feedback information regarding the orientation of the reflectors 32.

The actuator 40, in an example embodiment, comprises a micro-electro-mechanical (MEM) actuator. Another example includes a microhydraulic electro-wetting actuator. Other example embodiments include a dielectric elastomer actuator 40. Another example actuator comprises a voice coil motor. Such actuators allow for achieving the necessary amount of change in orientation of the reflectors 32 to address a variety of different pitch angles of the vehicle 22. At the same time, such actuators are capable of fitting within tight packaging constraints and contribute toward maintaining relatively low power requirements for achieving desired reflector orientations. Further, such actuators are capable or responding very quickly to driver circuitry of the controller 42 to achieve real-time, dynamic adjustment of the orientation of the reflectors 32 that tracks changes in the pitch angle of the vehicle 22.

The features of the example detector 20 are also useful for setting an orientation of the reflectors 32 relative to the radiation emitter 30 during a manufacturing or installation process associated with mounting the detector 20 on a particular vehicle. For example, the location or orientation of the detector 20 will be different on some vehicles than others. Rather than requiring an entirely different sensor configuration for such differing vehicles, a single detector design including reflectors 32 is adjustable to achieve a desired direction of the field of view 24. It may not be necessary to also provide dynamic adjustment on such vehicles while the vehicle is traveling but, of course, some such embodiments will include adaptive adjustment control.

Figure 4:
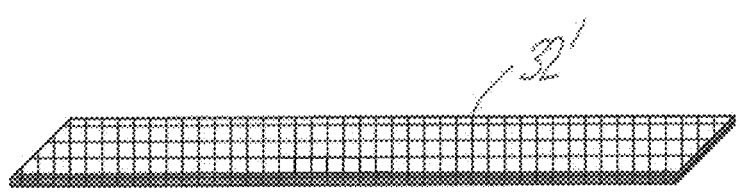
FIG. 4 schematically illustrates an example reflector designed according to an embodiment of this invention.

In some example embodiments, the reflectors 32 comprise solid pieces of the reflecting material. In other embodiments, as shown in FIG. 4, the reflectors 32' comprise a mesh of reflecting material. The reflector 32' in FIG. 4 includes a grid mesh size selected based upon the wavelength of the radiation emitted by the detector 20. For example, a grid mesh size that is two orders of magnitude smaller than the wavelength of the emitted radiation allows the reflection characteristic of the reflectors 32' to be the same as if they had solid reflecting surfaces. Considering a 76 GHz radar detector configuration, an example reflector 32' includes a metal mesh with fibers or strands that are 60 microns thick with spacing between them that are 40 microns wide. Keeping the grid spacing in a range of 35 to 100 times smaller than the wavelength allows for a mesh reflecting surface to perform similarly to a solid surface without requiring a particular thickness of the mesh material. Smaller grid spacing further reduces the effect of the thickness of the mesh material.

The disclosed example features of a detector designed according to an embodiment of this invention provide a solution to addressing the need for achieving detector radiation direction at a variety of angles relative to a vehicle. Controlling the orientation of the reflectors 32, 32' allows for dynamically adjusting the direction of the field of view 24 of the detector 20 to compensate for changes in the pitch angle of a vehicle. Additionally, changing the orientation of the reflectors 32 allows for accommodating different mounting orientations of a detector 20 on a vehicle during manufacturing or installation. Placing the reflectors 32 in the near field region and controlling their orientation allows for achieving a minimized vertical field while still having sufficient angular capability to address changes in vehicle pitch without introducing phase shift in the emitted radiation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A detector for use on a vehicle, the detector comprising:
a radiation emitter; and
a radiation steering device including a plurality of reflectors situated to reflect the radiation emitted by the radiation emitter,
wherein
the plurality of reflectors having at least one characteristic that limits any phase shift of the emitted radiation reflected from the reflectors,
the at least one characteristic of the plurality of reflectors comprises an index of refraction of a reflecting material of the reflectors and a thickness of the reflecting material,
the index of refraction is less than 1,
the thickness is greater than a skin depth corresponding to a distance that the emitted radiation penetrates the reflecting material, and
the distance that the emitted radiation penetrates the reflecting material is based on the wavelength of the emitted radiation, a resistivity of the reflecting material and a relative permeability of the reflecting material.

2. The detector of claim 1, wherein the radiation steering device includes
   an actuator configured to adjust an orientation of the plurality of reflectors; and
   a controller configured to determine an orientation of the plurality of reflectors relative to the radiation emitter to steer the emitted radiation reflected from the reflectors in a determined direction, the controller being configured to control the actuator to achieve the determined orientation.

3. A detector for use on a vehicle, the detector comprising:
   a radiation emitter; and
   a radiation steering device including
      a plurality of reflectors situated to reflect the radiation emitted by the radiation emitter, the plurality of reflectors having at least one characteristic that limits any phase shift of the emitted radiation reflected from the reflectors;
      an actuator configured to adjust an orientation of the plurality of reflectors; and
      a controller configured to determine an orientation of the plurality of reflectors relative to the radiation emitter to steer the emitted radiation reflected from the reflectors in a determined direction, the controller being configured to control the actuator to achieve the determined orientation
   wherein
      the at least one characteristic of the plurality of reflectors comprises an index of refraction of a reflecting material of the reflectors that is less than 1;
      the reflecting material has a critical angle based on the index of refraction; and
      the controller is configured to determine the orientation of the plurality of reflectors relative to the radiation emitter such than an angle of incidence of the emitted radiation approaching the reflectors is larger than the critical angle.

4. A detector supported on a vehicle, the detector comprising:
   a radiation emitter; and
   a radiation steering device including
      a plurality of reflectors situated to reflect the radiation emitted by the radiation emitter;
      an actuator configured to adjust an orientation of the plurality of reflectors; and
      a controller configured to determine an orientation of the plurality of reflectors relative to the radiation emitter to steer the emitted radiation reflected from the reflectors in a determined direction, the controller being configured to control the actuator to achieve the determined orientation, the controller being configured to receive an indication of a pitch angle of the vehicle and to determine the orientation of the plurality of reflectors based on the pitch angle of the vehicle.

5. The detector of claim 4, wherein
   the plurality of reflectors have at least one characteristic that limits any phase shift of the emitted radiation reflected from the reflectors;
   the at least one characteristic of the plurality of reflectors comprises an index of refraction of a reflecting material of the reflectors; and
   the index of refraction is less than 1.

6. The detector of claim 5, wherein
   the at least one characteristic of the plurality of reflectors comprises a thickness of the reflecting material; and
   the thickness is greater than a skin depth corresponding to a distance that the emitted radiation penetrates the reflecting material.

7. The detector of claim 6, wherein the thickness is at least 5 times greater than the skin depth.

8. The detector of claim 4, wherein
   the plurality of reflectors comprise a reflecting material; and
   the reflecting material comprises at least one of gold, copper or silver.

9. The detector of claim 4, wherein
   the plurality of reflectors comprise a reflecting material; and
   the reflecting material comprises a mesh.

10. The detector of claim 4, wherein the controller is configured to control the actuator to dynamically adjust the orientation of the plurality of reflectors based on changes in the pitch angle of the vehicle.

11. The detector of claim 4, wherein the orientation is the same for all of the reflectors.

12. The detector of claim 4, wherein
   the plurality of reflectors comprises a plurality of moveable louvers; and
   the actuator adjusts the orientation the plurality of moveable louvers simultaneously.

13. A method of directing radiation emitted by a detector supported on a vehicle, the method comprising:
   determining a direction for the radiation;
   adjusting an orientation of a plurality of reflectors to steer the radiation emitted by the detector and reflected from the reflectors in the determined direction;
   determining a pitch angle of the vehicle; and
   determining the orientation of the plurality of reflectors based on the pitch angle of the vehicle.

14. The method of claim 13, comprising dynamically adjusting the orientation of the plurality of reflectors based on changes in the pitch angle of the vehicle.

15. The method of claim 13, comprising adjusting the orientation of all of the reflectors simultaneously and wherein the orientation of all of the reflectors is the same relative to the detector.

16. The method of claim 13, wherein
   the plurality of reflectors have at least one characteristic that limits any phase shift of the emitted radiation reflected from the reflectors;
   the at least one characteristic of the plurality of reflectors comprises an index of refraction of a reflecting material of the reflectors; and
   the index of refraction is less than 1.

17. The method of claim 16, wherein
   the at least one characteristic of the plurality of reflectors comprises a thickness of the reflecting material;
   the thickness is greater than a skin depth corresponding to a distance that the emitted radiation penetrates the reflecting material; and
   the distance that the emitted radiation penetrates the reflecting material is based on the wavelength of the emitted radiation, a resistivity of the reflecting material and a relative permeability of the reflecting material.

18. The method of claim 16, wherein
   the reflecting material has a critical angle based on the index of refraction; and
   the method includes determining the orientation of the plurality of reflectors relative to the radiation emitter such than an angle of incidence of the emitted radiation approaching the reflectors is larger than the critical angle.

19. The method of claim 13, wherein
the plurality of reflectors comprise a reflecting material; and
the reflecting material comprises a mesh.

* * * * *